(12) United States Patent
Casas Noriega et al.

(10) Patent No.: US 8,752,398 B2
(45) Date of Patent: Jun. 17, 2014

(54) REFRIGERATING DEVICE, IN PARTICULAR FOR AIRCRAFT

(75) Inventors: Wilson Willy Casas Noriega, Hamburg (DE); Stefan Wischhusen, Hamburg (DE); Wolfgang Ebigt, Hamburg (DE); Dirk Kastell, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 955 days.

(21) Appl. No.: 12/790,284

(22) Filed: May 28, 2010

(65) Prior Publication Data

US 2010/0326105 A1 Dec. 30, 2010

Related U.S. Application Data

(60) Provisional application No. 61/217,358, filed on May 29, 2009.

(30) Foreign Application Priority Data

May 29, 2009 (DE) .......................... 10 2009 023 394

(51) Int. Cl.
F25B 41/00 (2006.01)
F25B 49/00 (2006.01)

(52) U.S. Cl.
USPC ........................................... 62/196.3; 62/197

(58) Field of Classification Search
USPC ................... 62/196.1, 196.3, 197, 199, 498
See application file for complete search history.

(56) References Cited

U.S. PATENT DOCUMENTS 4,434,624 A 3/1984 Cronin et al.
5,862,675 A * 1/1999 Scaringe et al. ............. 62/196.3
2008/0245083 A1 10/2008 Tutunoglu et al.

FOREIGN PATENT DOCUMENTS

DE 10 2008 035 216 A1 10/2009
FR 2362346 A * 4/1978
JP 2000274779 A * 10/2000

OTHER PUBLICATIONS

English translation of the abstract of DE 10 2008 035 316, Oct. 22, 2009, Daimler AG.

* cited by examiner

Primary Examiner — Chen Wen Jiang
(74) Attorney, Agent, or Firm — Krieg DeVault LLP

(57) ABSTRACT

The invention relates to a refrigerating device (10), in particular for an aircraft, having a refrigerant circuit, in which a refrigerant container (12), an expansion valve (14), an evaporator (16), a compressor (20) and a condenser (22) are disposed. To save energy during operation and to increase the reliability and availability of the refrigerating device (10), in the refrigerant circuit there is a compressor bypass line (26), in which a bypass valve (18) is disposed, and a refrigerant pump (30) that is disposed downstream of the condenser (22) and upstream of the evaporator (16). It is possible to dispense with the refrigerant pump (30) if the condenser (22) is disposed at a higher level than the evaporator (16) in the refrigerant circuit.

6 Claims, 2 Drawing Sheets

REFRIGERATING DEVICE, IN PARTICULAR FOR AIRCRAFT

CROSS REFERENCE TO RELATED APPLICATIONS

Figure 1:
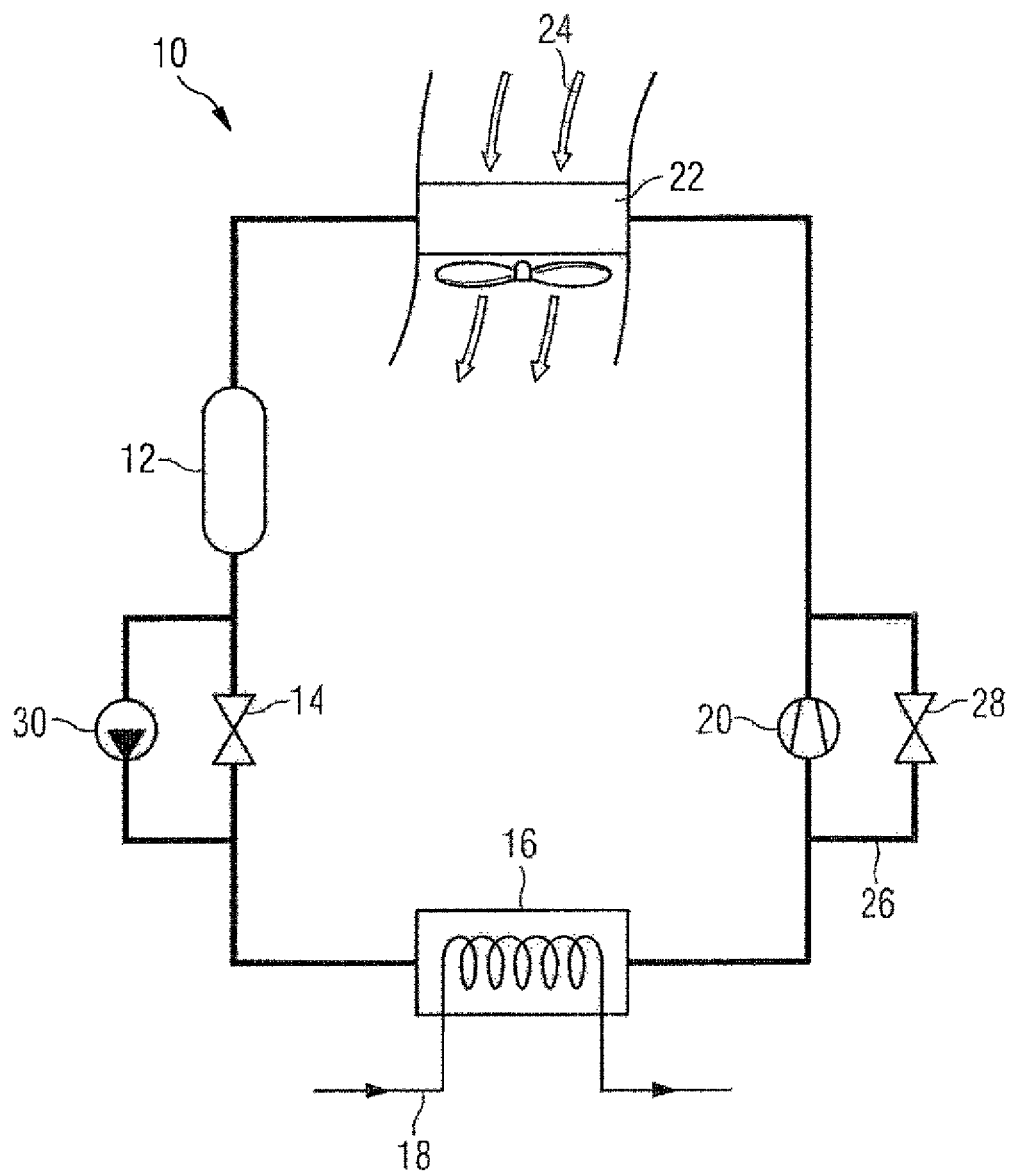

The present application claims priority to German Patent Application No. 10 2009 023 394.6, filed May 29, 2009 and claims the benefit of U.S. Provisional Patent Application No. 61/217,358, filed May 29, 2009, each of which is incorporated herein by reference.

The invention relates to a refrigerating device, in particular for an aircraft, having a refrigerant circuit, in which a refrigerant container, an expansion valve, an evaporator, a compressor and a condenser are disposed.

Refrigerating devices of this type are generally known and are used for example in refrigerators or air conditioning systems. A cooled refrigerant flows out of the refrigerant container through the expansion valve to an evaporator, in which a medium to be cooled, for example air or a liquid to be cooled, transfers some of the heat it contains to the refrigerant and so is itself cooled, while the refrigerant evaporates due to the supplied thermal energy. The now gaseous refrigerant is then compressed by means of the compressor and conveyed, in the overheated state resulting from the compression process, through the condenser, which is cooled by a cooling medium (usually ambient air). In the condenser the refrigerant is cooled to the extent that it condenses. The now once more liquid refrigerant flows back into the refrigerant container and the cycle may begin anew.

Refrigerating devices in aircraft operate according to the same principle. However, because during a flight at the currently customary altitudes the ambient temperature is very low and generally lies in a range of between −30° C. and −60° C., the cooling of the refrigerant causes the system pressure in the condenser to drop to such an extent that operation of the compressor is no longer possible. To avoid the previously described problem, in aircraft at the described, very low ambient temperatures only a small fraction of the hot refrigerant gas compressed by the compressor is conveyed through the condenser, while the remaining, larger fraction is conveyed past the condenser (and is therefore not cooled) to the refrigerant container in order to guarantee a minimum system pressure that enables the compressor to operate and maintain the refrigerant circuit.

The underlying object of the invention is to provide an improved refrigerating device that operates in a more energy-saving and reliable manner.

According to a first basic form of construction, proceeding from an initially described refrigerating device this object is achieved according to the invention in that the refrigerant circuit additionally comprises a compressor bypass line, in which a bypass valve for opening and closing the compressor bypass line is disposed, as well as a refrigerant pump that is disposed downstream of the condenser and upstream of the evaporator in the refrigerant circuit. In such a refrigerating device, at very cold ambient temperatures the compressor may be switched off and the bypass valve in the compressor bypass line may be opened. The refrigerant in the form of a liquid gas or purely a gas that comes out of the evaporator then bypasses the compressor and flows through the condenser and back into the refrigerant container. The refrigerant pump is used to maintain the refrigerant circuit and need only overcome the pressure loss in the lines of the circuit and of the components in the circuit. Because of the low pressure difference of markedly less than 1 bar that is to be overcome, there is only a small amount of work to be done by the refrigerant pump, with the result that the refrigerant pump requires only a little (electrical) power. In such operating states the energy saving compared to the conventionally used compressor is therefore significant. In an aircraft the fuel consumption is therefore reduced.

The service life and the reliability of the refrigerating device are moreover improved because during the period that the low ambient temperature is available the compressor need not be operated. What is more, the compressor need no longer be designed for operation at very low temperatures and for example makes less demands on its lubrication. Finally, even in the event of a damaged compressor the refrigerating device according to the invention still operates if the low ambient temperature is available. All in all, particularly if the refrigerating device according to the invention is used in an aircraft that during operation is situated for a long time in phases, in which a very low ambient temperature is available, the result is a noticeable reduction in fuel consumption and significantly increased reliability and/or availability of the refrigerating device.

In a preferred development of the refrigerating device according to the invention, the refrigerant pump is disposed downstream of the refrigerant container in the refrigerant circuit. The refrigerant pump delivers the liquid refrigerant from the refrigerant container through the open expansion valve into the evaporator. In a modified form of construction, the refrigerant pump is connected in parallel to the expansion valve and the expansion valve is closed automatically if the refrigerant pump is in operation. The expansion valve is preferably an electronically controlled valve and not, as is customary in the prior art, a thermostatically controlled valve.

According to the second basic form of construction, proceeding from the initially described type of refrigerating device the above-stated object is achieved according to the invention in that the refrigerant circuit additionally comprises a compressor bypass line, in which a bypass valve is disposed, and that the condenser is disposed at a higher geodetic level than the evaporator in the refrigerant circuit. This form of construction saves even more energy than the first basic form of construction because, as the condenser is disposed at a higher level, it is possible to dispense with the refrigerant pump. With this form of construction, because of the temperature- and pressure differences in the refrigerant circuit a natural circulation of the refrigerant is obtained. If it is not possible to dispose the condenser higher than the evaporator, it is necessary to revert to the first basic form of construction.

In all of the previously described forms of construction, the bypass valve is preferably operable remotely, i.e. it is provided with a motorized operating mechanism and may be opened or closed by remote control.

Particularly preferred developments of the refrigerating device according to the invention comprise a measuring device that outputs a signal indicating the ambient temperature, wherein in dependence upon said signal the compressor is switched off and the bypass valve opened or the compressor is switched on and the bypass valve closed. If, given such a system, the ambient temperature is below a predetermined value, the compressor is switched off and the bypass valve opened. In the case of the first basic form of construction of the refrigerating device, the refrigerant pump is additionally switched on. If on the other hand a predetermined ambient temperature is exceeded, then the bypass valve is closed and the compressor switched on. If a refrigerant pump is provided, it is switched off. The measuring device is preferably designed in such a way that it measures the ambient temperature at the condenser or in the vicinity thereof.

The refrigerant container is preferably designed in such a way that it filters and/or dries, i.e. removes water from, the refrigerant flowing through it. As a refrigerant, any refrigerant typically used in refrigerating devices may be used in the refrigerating device according to the invention.

There now follows a detailed description of an embodiment of a refrigerating device according to the invention together with further advantages with reference to the accompanying diagrammatic figures. These show:

FIG. 1 a flow diagram of a refrigerating device according to the invention, and

Figure 2:
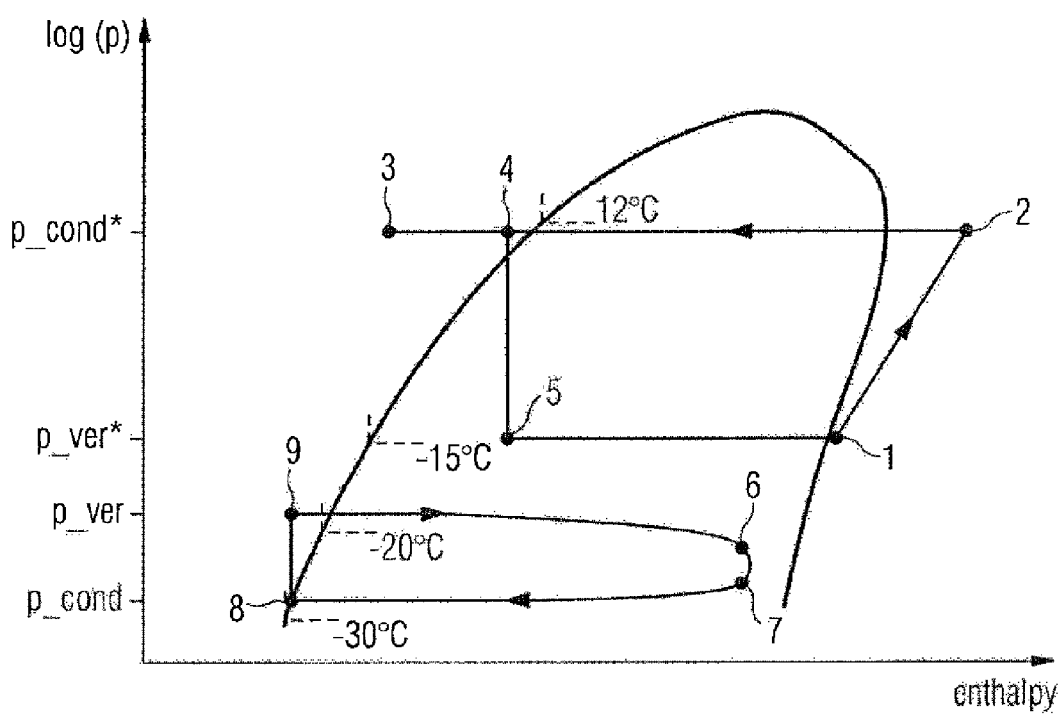

FIG. 2 a pressure/enthalpy diagram illustrating the energetic advantages of the refrigerating device according to the invention.

In FIG. 1 a refrigerating device generally denoted by 10 is diagrammatically represented. The refrigerating device 10 is used to convey a refrigerant in a circuit and, in so doing, with the aid of the refrigerant remove heat from a medium to be cooled, for example a liquid or air. The refrigerant that heats up as a result of heat absorption is then cooled again in order to be available for renewed heat absorption.

The refrigerating device 10 comprises a refrigerant container 12 for receiving a supply of liquid refrigerant. In flow direction of the refrigerant, the refrigerant container 12 is followed by an expansion valve 14, by means of which the refrigerant, which is pressurized in the refrigerant container 12, is expanded and at the same time cooled down further. In the illustrated embodiment the expansion valve 14 is electronically controlled, i.e. the extent of its open position is variably adjustable under the control of a non-illustrated control unit in order to be able to adjust the degree of expansion according to requirements.

In the refrigerant circuit the expansion valve 14 is followed by an evaporator 16, through which the medium 18 to be cooled flows. In so doing, the medium 18 cools down and transfers heat to the refrigerant passing through the evaporator 16, which refrigerant then in a conventional manner changes to the gaseous state, i.e. evaporates.

The now gaseous refrigerant then flows through a compressor 20, which is disposed in the refrigerant circuit and which compresses the gaseous refrigerant and hence brings it to an overheated state. To prevent the compressor 20 running full of liquid, a non-return valve (not represented) may be provided at the compressor inlet or compressor outlet.

From the compressor 20 the gaseous, overheated refrigerant passes into a condenser 22, through which a cooling medium 24, for example ambient air, for cooling the refrigerant flows. The cooling of the refrigerant effected in the condenser 22 allows the refrigerant to condense and the refrigerant passes in the liquid state back into the refrigerant container 12.

The previously described construction and its function correspond to a conventional refrigerating device. To save energy and increase the reliability and availability of the refrigerating device 10, the refrigerating device 10 additionally comprises a compressor bypass line 26, in which a bypass valve 28 is disposed, as well as a refrigerant pump 30, which in the present embodiment is connected in parallel to the expansion valve 14 in the refrigerant circuit. The expansion valve 14 in the present case is an electronically controlled valve. At the discharge-end outlet of the refrigerant pump 30 a non-return valve is disposed in the line bypassing the expansion valve 14 and may also be integrated into the refrigerant pump 30. This non-return valve opens only while the refrigerant pump 30 is running and otherwise blocks the line, in which refrigerant pump 30 is situated.

These additional components allow the refrigerating device 10 to be operated in two different ways. If the temperature of the cooling medium 24 is in a normal range, for example in a range of between −10° C. and +40° C., then the refrigerating device 10 is operated in the previously described, conventional manner. In this conventional operating state the bypass valve 28 is closed and the refrigerant pump 30 is switched off, whereas the expansion valve 14 is open in dependence upon requirements.

If the temperature of the cooling medium 24 drops below a predetermined value, for example below −30° C., the refrigerating device 10 is operated in a second mode of operation, in which the compressor 20 is switched off, the bypass valve is open and the refrigerant pump 30 is switched on. In this second mode of operation the expansion valve 14 is closed.

In the second mode of operation it is no longer the compressor 20 but the refrigerant pump 30 that ensures a circulating of the refrigerant in the circuit. As the refrigerant because of the low temperature of the cooling medium 24 is cooled down in the condenser 22 to a lower temperature than in the first, conventional mode of operation, as a rule only a partial evaporation of the refrigerant occurs in the evaporator 16, i.e. from the evaporator 16 it is mostly a two-phase mixture of liquid and gaseous refrigerant that flows through the compressor bypass line 26 into the condenser 22. The cooling effected in the condenser 22 returns the refrigerant fully to the liquid state.

Because the compressor 20 requires considerably more energy to compress the gaseous refrigerant than the refrigerant pump 30 needs to circulate the liquid refrigerant in the circuit, the refrigerating device 10 in its second mode of operation requires markedly less energy. At the same time, in the second mode of operation the compressor 20 is spared, which significantly prolongs its service life and reduces the probability of its failure.

The switching of the refrigerating device 10 between the two described modes of operation may be effected manually but preferably occurs automatically by means of a non-represented control unit that is electrically connected to the individual components of the device 10, in particular to the expansion valve 14, the refrigerant pump 30, the compressor 20 and the bypass valve 28 in the compressor bypass line 26. This control unit is further connected to a temperature measuring device (not shown), which by means of a suitable sensor (not represented) determines the temperature of the cooling medium 24, preferably at a point just before the cooling medium 24 flows through the condenser 22. If the temperature of the cooling medium 24 is below a previously defined value, the control unit switches the refrigerating device 10 to its second mode of operation. If the temperature of the cooling medium 24 exceeds a previously defined value, the control unit switches the refrigerating device 10 to the first mode of operation. In order in the event of a slight fluctuation of the temperature of the cooling medium 24 to prevent a continuous switching back and forth between first and second modes of operation, the two previously defined temperatures are preferably not identical but differ by an amount $\Delta t$, which may be for example 5° C.

In FIG. 2 the advantages of the second mode of operation are evident from a pressure/enthalpy diagram and various operating points.

In the known conventional system the refrigerating process while in flight runs with a comparatively large pressure difference (p_cond*−p_ver*) between evaporator and condenser that has to be generated by the compressor 20. In FIG. 2 the points 1 to 5 represent the course of the conventional refrigerating process using the compressor 20. In this case, point 1 symbolizes the state of the refrigerant at the evaporator outlet, point 2 the state of the refrigerant at the condenser inlet, point 3 the state of the refrigerant that has cooled down after flowing through the condenser, point 4 a refrigerant mixing point, which arises when refrigerant having the state of point 3 is mixed with gaseous refrigerant that is fed from the compressor outlet back into the refrigerant circuit downstream of the condenser, thereby bypassing the condenser, and point 5 the state of the refrigerant at the outlet of the expansion valve.

In contrast thereto, with the proposed solution heat is transferred with a pressure level between condenser (p_cond) and evaporator (p_ver) that corresponds approximately to the saturation pressure of the refrigerant at the existing outside temperature. In FIG. 2 the state points 6 to 9 symbolize the refrigerating process while in flight, such as it occurs in accordance with the present invention. In this case, point 6 represents the state of the refrigerant at the evaporator outlet, point 7 the state of the refrigerant at the condenser inlet, point 8 the state of the refrigerant at the refrigerant pump inlet, and point 9 the state of the refrigerant at the refrigerant pump outlet. It may clearly be seen that the work to be done by the pump 30 is confined to maintaining the circuit (pressure losses in the appliances and in the lines). As a result of the comparatively low pressure difference of much less than 1 bar, very little electrical power is needed to operate the refrigerant pump 30.

If it is possible to dispose the condenser 22 of the refrigerating device 10 at a higher level than the evaporator 16, then according to a second constructional variant that is not shown here it is also possible to dispense with the refrigerant pump 30, because then the temperature and/or pressure differences in the refrigerant circuit provide a natural circulation of the refrigerant.

The invention claimed is:

1. Refrigerating device, in particular for an aircraft, having a refrigerant circuit, in which are disposed:
   a refrigerant container,
   an expansion valve,
   an evaporator,
   a compressor, and
   a condenser,
   wherein the refrigerant circuit further comprises a compressor bypass line, in which a bypass valve is disposed, as well as a refrigerant pump that is disposed downstream of the condenser and upstream of the evaporator, wherein the refrigerant pump is disposed downstream of the refrigerant container in the refrigerant circuit, and the refrigerant pump is connected in parallel to the expansion valve wherein the expansion valve closes automatically if the refrigerant pump is in operation when the ambient temperature is below a predetermined ambient temperature.

2. Refrigerating device according to claim 1, wherein the bypass valve is remote controllable.

3. Refrigerating device according to claim 1, wherein the expansion valve is an electronically controlled valve.

4. Refrigerating device according to claim 1, wherein a measuring device is provided, which outputs a signal indicating the ambient temperature, and that in dependence upon said signal the compressor is switched off and the bypass valve opened or the compressor is switched on and the bypass valve closed.

5. Refrigerating device according to claim 4, wherein the measuring device measures the ambient temperature at the condenser or in the vicinity thereof.

6. Refrigerating device according to claim 1, wherein the refrigerant container filters and/or dries the refrigerant flowing through it.

* * * * *